United States Patent
Choi et al.

(10) Patent No.: US 7,633,836 B2
(45) Date of Patent: Dec. 15, 2009

(54) METHOD AND APPARATUS FOR CONTROLLING ALARM FUNCTION OF MOBILE DEVICE WITH INERTIAL SENSOR

(75) Inventors: Eun Seok Choi, Anyang-si (KR); Dong Yoon Kim, Seoul (KR); Ki Tae Kim, Gumi-si (KR); Sung Jung Cho, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 17 days.

(21) Appl. No.: 11/801,660

(22) Filed: May 10, 2007

(65) Prior Publication Data

US 2007/0263490 A1    Nov. 15, 2007

(30) Foreign Application Priority Data

May 11, 2006    (KR)    ............... 10-2006-0042694

(51) Int. Cl.
G08B 21/00    (2006.01)
(52) U.S. Cl. .................. 368/11; 368/73; 340/669
(58) Field of Classification Search .......... 368/10, 368/244, 11; 340/669
See application file for complete search history.

(56) References Cited

U.S. PATENT DOCUMENTS 4,702,614 A * 10/1987 Copley et al. ............... 368/72
6,992,580 B2    1/2006 Kotzin et al. ........... 340/539.11
2003/0142591 A1* 7/2003 Baweja et al. ............... 368/263
2007/0162238 A1* 7/2007 Jeansonne et al. ............ 702/41

FOREIGN PATENT DOCUMENTS

| CN | 1595819 | 3/2005 |
|---|---|---|
| CN | 1691686 | 11/2005 |
| JP | 2003-151038 | 5/2003 |
| JP | 2005-286809 | 10/2005 |

OTHER PUBLICATIONS

Script, Michael; et al.; Patent Application Publication No: US 2005/0030179 A1; Publication Date: Feb. 10, 2005; "Portable Motion Detector And Alarm System and Method;" . . . .
Baweja, Baljeet Singh, et al.; Patent Application Publication No. US 2003/0142591 A1; Publication Date: Jul. 31, 2003; "Interactive Alarm Clock and Method;" . . . .

* cited by examiner

*Primary Examiner*—Vit W Miska
*Assistant Examiner*—Sean Kayes
(74) *Attorney, Agent, or Firm*—Cha & Reiter, LLC

(57) ABSTRACT

Disclosed are a method and an apparatus for controlling an alarm function of a mobile device with an inertial sensor. In one example of the method, after an initial threshold value is established, an alarm occurrence is generated at a predefined hour. If the alarm occurrence is the first, an alarm control unit detects a first movement of the mobile device due to the alarm occurrence through the inertial sensor, and adjusts the initial threshold value according to the first movement. If the alarm occurrence is not the first, the alarm control unit detects a second movement of the mobile device through the inertial sensor, compares the second movement with the adjusted threshold value, and stops the alarm occurrence if the second movement is greater than the adjusted threshold value.

15 Claims, 11 Drawing Sheets

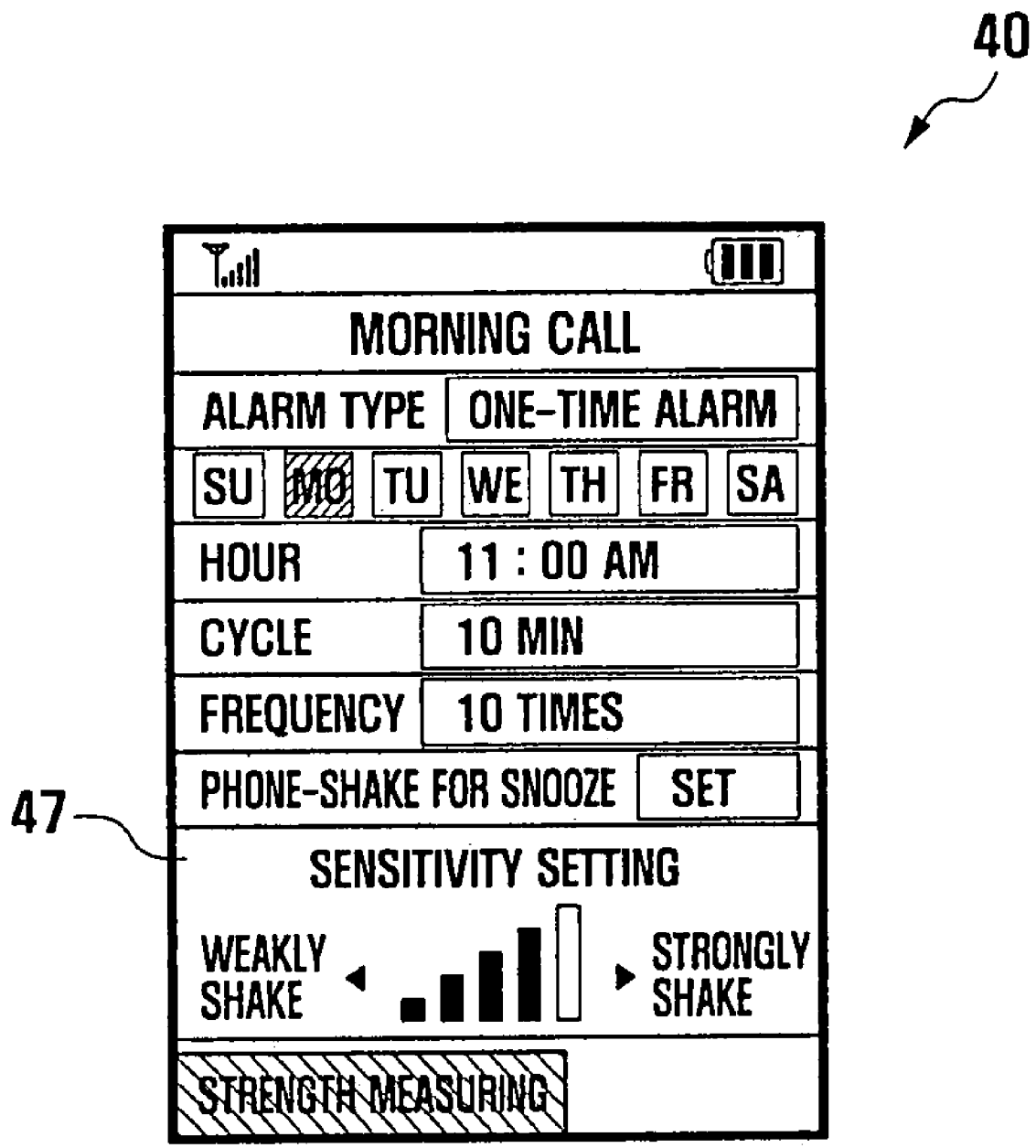

METHOD AND APPARATUS FOR CONTROLLING ALARM FUNCTION OF MOBILE DEVICE WITH INERTIAL SENSOR

CLAIM OF PRIORITY

This U.S. non-provisional application claims the benefit of the earlier filing date, under 35 U.S.C. §119, to Korean Patent Application No. 2006-42694, which was filed in the Korean Intellectual Property Office on May 11, 2006, the contents of which are incorporated by reference herein in its entirety.

BACKGROUND OF THE INVENTION

1. Field of the Invention

The present invention relates to mobile devices and, more particularly, to an alarm control method and a related apparatus that establishes a threshold value for movement sensing in a mobile device with an inertial sensor and stopping an alarm by sensing a movement of the mobile device exceeding the threshold value.

2. Description of the Related Art

A mobile device, e.g., a mobile phone, has typical alarm functions such as a morning wakeup call, appointment indication, etc. A snooze function is also a sort of such alarm functions. The snooze function is an alarm occurrence that is repeated at regular intervals after an initial alarm occurs.

For example, the snooze function may be set by a user so as to generate an initial alarm indication at six o'clock and repeatedly generate subsequent alarm indications five times at intervals of ten minutes. In this case, even though a user stops an initial alarm, the snooze function forces the next alarm(s) to occur in ten minutes. Additionally, such alarm occurrences are repeated four times unless there is a special operation, such as a press of an end button, for terminating the snooze function. So the snooze function can be favorably applied to alarm functions, especially a morning wake-up call.

To stop a current alarm in a conventional snooze function, a user has to press a button. This may sometimes cause inconvenience to a user, especially in sleeping.

SUMMARY OF THE INVENTION

An aspect of the present invention is to control an alarm function by means of movement sensing.

Another aspect of the present invention is to establish a threshold value for movement sensing.

Still another aspect of the present invention is to control an alarm function by means of voice recognition in addition to movement sensing.

According to an exemplary embodiment of the present invention, a method for controlling an alarm function of a mobile device with an inertial sensor comprises the steps of establishing a threshold value for control of the alarm function, generating an alarm occurrence at a predefined hour, detecting a movement of the mobile device through the inertial sensor, creating a movement-sensing signal based on the detected movement, comparing the movement-sensing signal with the threshold value and stopping the alarm occurrence if the movement-sensing signal is a in accordance with, the threshold value.

The method may further comprise the step of determining whether an end signal is inputted after the alarm occurrence is generated, and terminating the alarm function when the end signal is inputted.

Additionally, the method may further comprise the step of determining whether the time of the stopped alarm occurrence satisfies a predefined alarm frequency; and, terminating the alarm function when the predefined alarm frequency is satisfied.

In the method, establishing of the threshold value may include detecting a movement of the mobile device through the inertial sensor, and establishing the threshold value such that the threshold value is greater than the detected movement.

According to another exemplary embodiment of the present invention, a method for controlling an alarm function of a mobile device with an inertial sensor comprises the steps of establishing an initial threshold value for control of the alarm function, generating an alarm occurrence at a predefined hour, determining whether the alarm occurrence is the first, if the alarm occurrence is the first, detecting a first movement of the mobile device due to the alarm occurrence through the inertial sensor and adjusting the initial threshold value according to the first movement due to the alarm occurrence.

In this method, the initial threshold value may be adjusted to be greater than the maximum of the first movement due to the alarm occurrence and to be smaller than the initial threshold value.

According to still another exemplary embodiment of the present invention, a method for controlling an alarm function of a mobile device with an inertial sensor comprises the steps of generating an alarm occurrence at a predefined hour, detecting a first movement of the mobile device due to the alarm occurrence through the inertial sensor and establishing a threshold value according to the first movement due to the alarm occurrence.

According to yet another exemplary embodiment of the present invention, a method for controlling an alarm function of a mobile device comprises the steps of recording and storing a first voice signal for control of the alarm function, generating an alarm occurrence at a predefined hour, receiving a second voice signal inputted through a microphone, comparing the first and second voice signals; and stopping the alarm occurrence if the first and second voice signals are substantially similar.

According to still another exemplary embodiment of the present invention, an apparatus for controlling an alarm function of a mobile device comprises a memory unit storing a threshold value and a predefined alarm hour, an inertial sensor detecting a first movement of the mobile device and creating a movement-sensing signal based on the first movement and an alarm control unit generating an alarm occurrence at the predefined hour, comparing the movement-sensing signal with the threshold value, and stopping the alarm occurrence if the movement-sensing signal is greater than the threshold value.

BRIEF DESCRIPTION OF THE DRAWINGS

FIGS. 5A to 5C are screen views showing an alarm setting menu used for the method shown in FIG. 4.

DETAILED DESCRIPTION OF THE INVENTION

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will convey the scope of the invention to those skilled in the art. The principles and features of this invention may be employed in numerous varying embodiments without departing from the scope of the invention.

Well-known structures and processes are not described or illustrated in detail to avoid obscuring the essence of the present invention.

Figure 1:
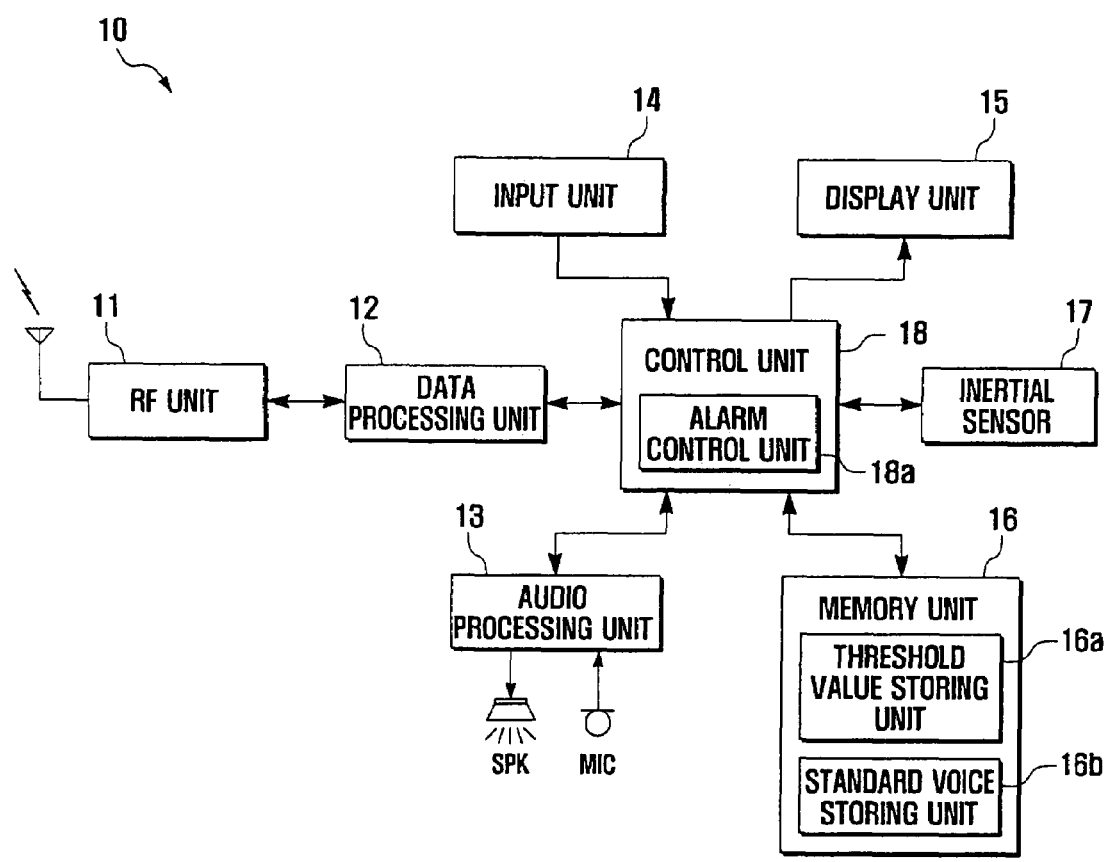
FIG. 1 is a block diagram showing a mobile device having an inertial sensor in accordance with the present invention.

FIG. 1 shows, in a block diagram, a mobile device in accordance with the present invention. Referring to FIG. 1, the mobile device 10 includes an RF unit 11, a data processing unit 12, an audio processing unit 13, an input unit 14, a display unit 15, a memory unit 16, an inertial sensor 17, and a control unit 18. Furthermore, the memory unit 16 may include a threshold value storing unit 16a and/or a standard voice storing unit 16b. The threshold value storing unit 16a or voice storing unit 16b may be optionally included in memory unit 16 depending upon the specific embodiment of the invention. The control unit 18 has an alarm control unit 18a.

The RF unit 11 performs the function of wireless communication for the mobile device 10. The RF unit 11 has generally an RF transmitter and an RF receiver. The RF transmitter up-converts the frequency of signals being transmitted and amplifies the up-converted signals. The RF receiver further amplifies signals being received and down-converts the frequency thereof.

The data processing unit 12 encodes and modulates signals being transmitted, and demodulates and decodes signals being received. The data processing unit 12 includes generally a modem (modulator/demodulator) and a codec (coder/decoder). The codec has a data codec for processing packet data and an audio codec for processing audio signals such as a voice. If necessary, the data processing unit 12 may be incorporated into the control unit 18.

The audio processing unit 13 receives audio signals from the audio codec of the data processing unit 12 and then reproduces the audio signals through a speaker SPK. Additionally, the audio processing unit 13 receives audio signals from a microphone MIC and then sends the audio signals to the audio codec of the data processing unit 12.

The input unit 14 produces input signals depending on a user's action. The input unit 14 may have a keypad normally composed of alphanumeric keys and function keys, and may further have a pointing device such as a touchpad, an optical jog, etc.

The display unit 15 visually represents information related to states and operations of the mobile device 10. The display unit 15 may be formed of a liquid crystal display (LCD), an active-matrix organic light-emitting diode (AM OLED), or other alternatives.

The memory unit 16 stores various programs executable in the mobile device 10 and related data. The threshold value storing unit 16a of the memory unit 16 stores a threshold value used for movement sensing. The standard voice storing unit 16b stores some standard voices used for voice comparison. These will be described later.

The inertial sensor 17, for perceiving the movement of the mobile device 10, has at least one of an acceleration sensor and an angular velocity sensor (also referred to as a gyro sensor). The acceleration sensor measures the acceleration of a linear movement, and the angular velocity sensor measures the acceleration of a rotational movement. A 3-axis sensor with X-axis, Y-axis and Z-axis may be preferably used for both sensors. However, if necessary, a 1-axis or 2-axis sensor may be alternatively used. The inertial sensor 17 detects the movement of the mobile device 10, creates sensing signals, and sends the sensing signals to the alarm control unit 18a. The movement the inertial sensor 17 detects includes user's intended or non-intended actions and minute trembling movements of the mobile device 10 produced by alarm sounds.

The control unit 18 controls the operation of the mobile device 10. The alarm control unit 18a of the control unit 18 performs setting and altering alarm functions including a snooze function, and also generates alarm sounds according to predefined alarm conditions. After an alarm occurs, the alarm control unit 18a receives a movement-sensing signal from the inertial sensor 17, and then compares the movement-sensing signal with a threshold value stored in the storing unit 16a. If the signal is greater than the threshold value, the alarm control unit 18a stops a current alarm occurrence. Additionally, the alarm control unit 18a receives a measured value associated with an alarm sound from the inertial sensor 17, and adjusts the threshold value depending on the measured alarm value.

The alarm control unit 18a receives a voice signal from the microphone MIC after an alarm occurs, and compares the received voice signal with a standard voice stored in the storing unit 16b. If the received voice signal accords with the standard voice, the alarm control unit 18a stops the current alarm occurrence.

Figure 2:
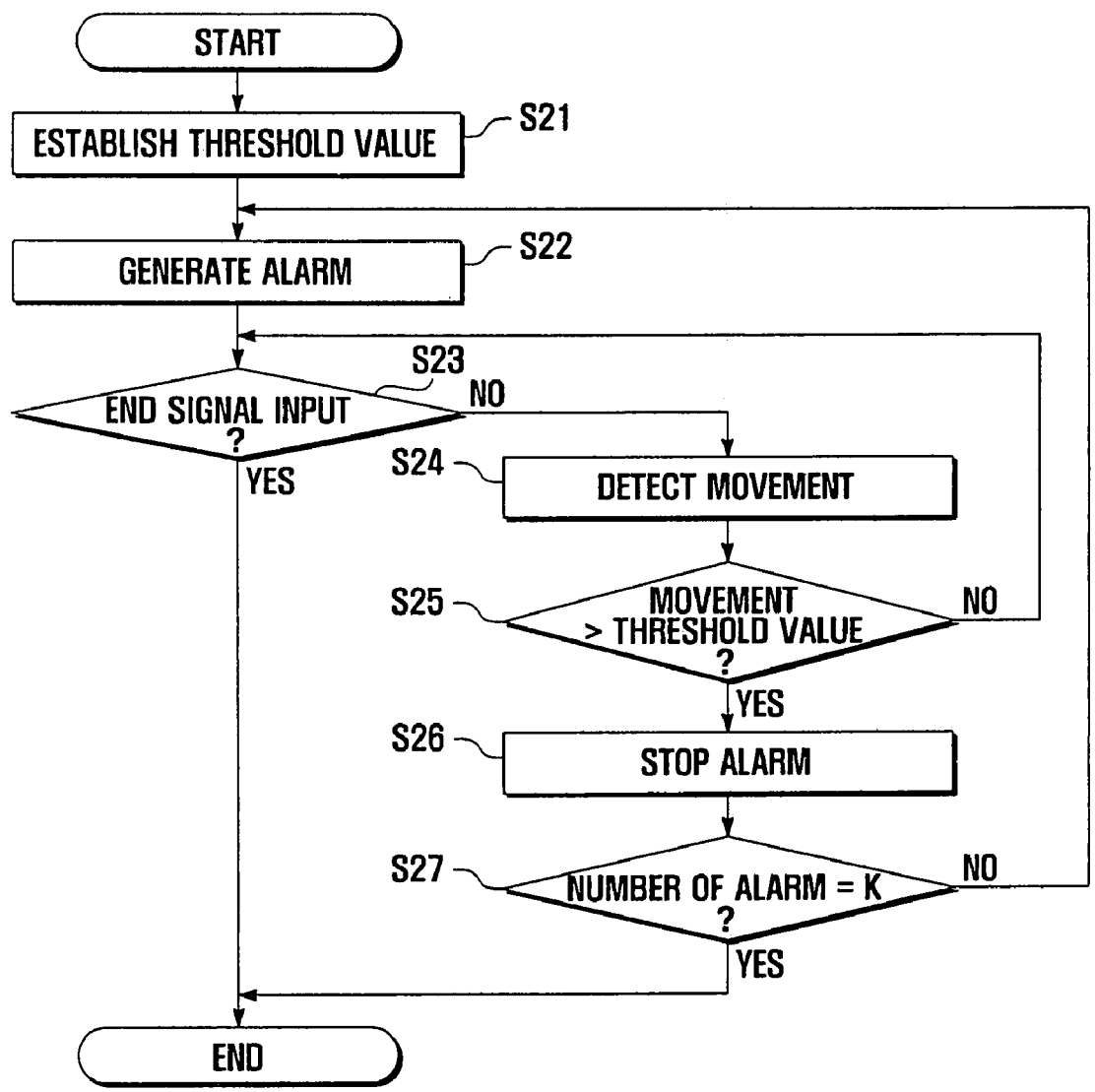
FIG. 2 is a flow diagram showing a method for controlling an alarm function of a mobile device in accordance with an exemplary embodiment of the present invention.

FIG. 2 shows, in a flow diagram, a method for controlling an alarm function of a mobile device in accordance with an exemplary embodiment of the present invention.

Referring to FIGS. 1 and 2, at the outset, the alarm control unit 18a establishes a threshold value in step S21 and stores the threshold value into the threshold value storing unit 16a. Here, the threshold value is a critical point of movement sensing for alarm control. When the inertial sensor 17 detects a certain movement of the mobile device 10, the alarm control unit 18a regards the detected movement as sensed only if the magnitude of the movement is greater than the threshold value. That is, the movement the magnitude of which is smaller than the threshold value is ignored and regarded as not sensed. The threshold value in this embodiment is a default assigned when the mobile device is manufactured or set. In another embodiment, a user may establish the threshold value by using movement sensing. In another further embodiment, the threshold value may be automatically adjusted depending on alarm sounds.

In step S22, the alarm control unit 18a generates an alarm according to predefined alarm conditions, especially at a pre-defined alarm hour. The alarm conditions may include an alarm type, an alarm hour, an alarm cycle, an alarm frequency, and alarm melodies. The alarm type is one-time alarm, every-day alarm, etc, and the alarm hour is a particular time when alarm occurs. The alarm cycle is a time interval between two successive occurrences of alarms, and the alarm frequency is the number of alarm repetition. For example, if the alarm conditions are set to one-time alarm on Monday (alarm type), six a.m. (alarm hour), ten minutes (alarm cycle), and five times (alarm frequency), alarm sounds will occur five times at ten-minute intervals from six a.m. on every Monday. Unless there is an input for stopping an alarm, the current alarm occurrence continues for one minute, for example.

After an alarm occurs, in step S23 the alarm control unit 18a determines whether an end signal is inputted through the input unit 14. If there is an end signal input, the alarm control unit 18a terminates an alarm function, e.g. a snooze function.

If there is no end signal input after an alarm occurrence, in step S24 the inertial sensor 17 detects the movement of the mobile device 10. Then the inertial sensor 17 creates a move-ment-sensing signal and sends it to the alarm control unit 18a. In step S25, the alarm control unit 18a compares the magni-tude of a received movement-sensing signal with the thresh-old value stored in the threshold value storing unit 16a.

Figure 3:
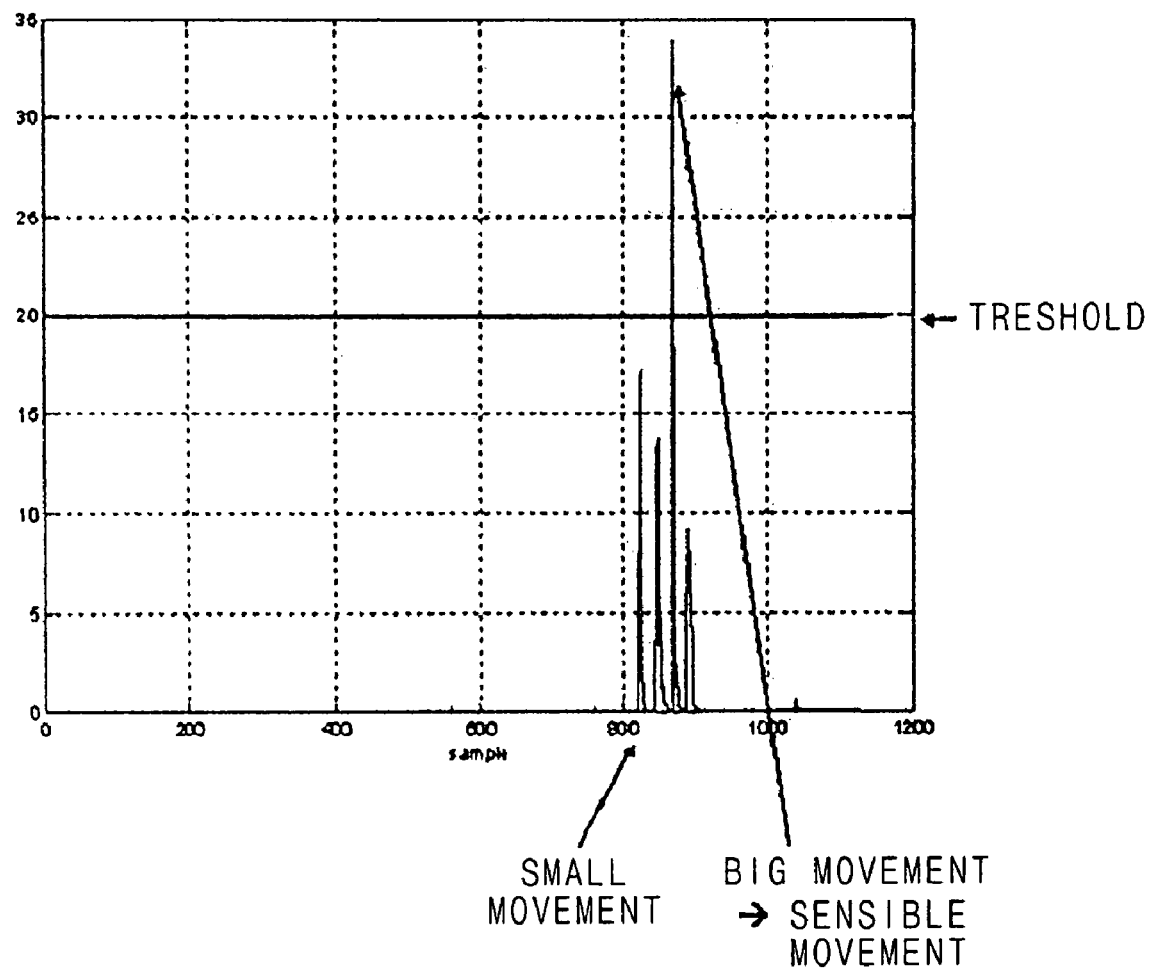
FIG. 3 is a graph showing a relation between movement-sensing signals and a threshold value.

FIG. 3 is a graph that shows a relation between movement-sensing signals and the threshold value. In FIG. 3, the hori-zontal axis represents time, and the vertical axis represents variance of acceleration (m/sec²) measured by the inertial sensor. Movements of the mobile device are detected at regu-lar intervals (e.g., 20 ms) and expressed in acceleration data. These data correspond to the magnitude of movement-sens-ing signals and are plotted in the order of time. In FIG. 3, the threshold value is established as 20 units.

Returning to FIG. 2, if the magnitude of a movement-sensing signal is greater than the threshold value as the result of comparison in step S25, the alarm control unit 18a stops the current alarm in step S26. Otherwise, if the magnitude of a movement-sensing signal is smaller than the threshold value, the alarm control unit 18a performs the above dis-cussed processing by proceeding to step S23.

After the current alarm occurrence is stopped, in step S26 the alarm control unit 18a determines whether the number of the current alarm occurrence satisfies a predefined alarm fre-quency (k). For example, if a predefined alarm frequency is five times, the alarm control unit 18a determines whether a current occurring alarm is the fifth one generated.

If a predefined alarm frequency is satisfied, the alarm con-trol unit 18a terminates an alarm function. Otherwise, the alarm control unit 18a returns to step S22 and generates the next alarm.

While a threshold value in this embodiment is pre-estab-lished as a default, a threshold value in the following embodi-ment may be established by a user.

Figure 4:
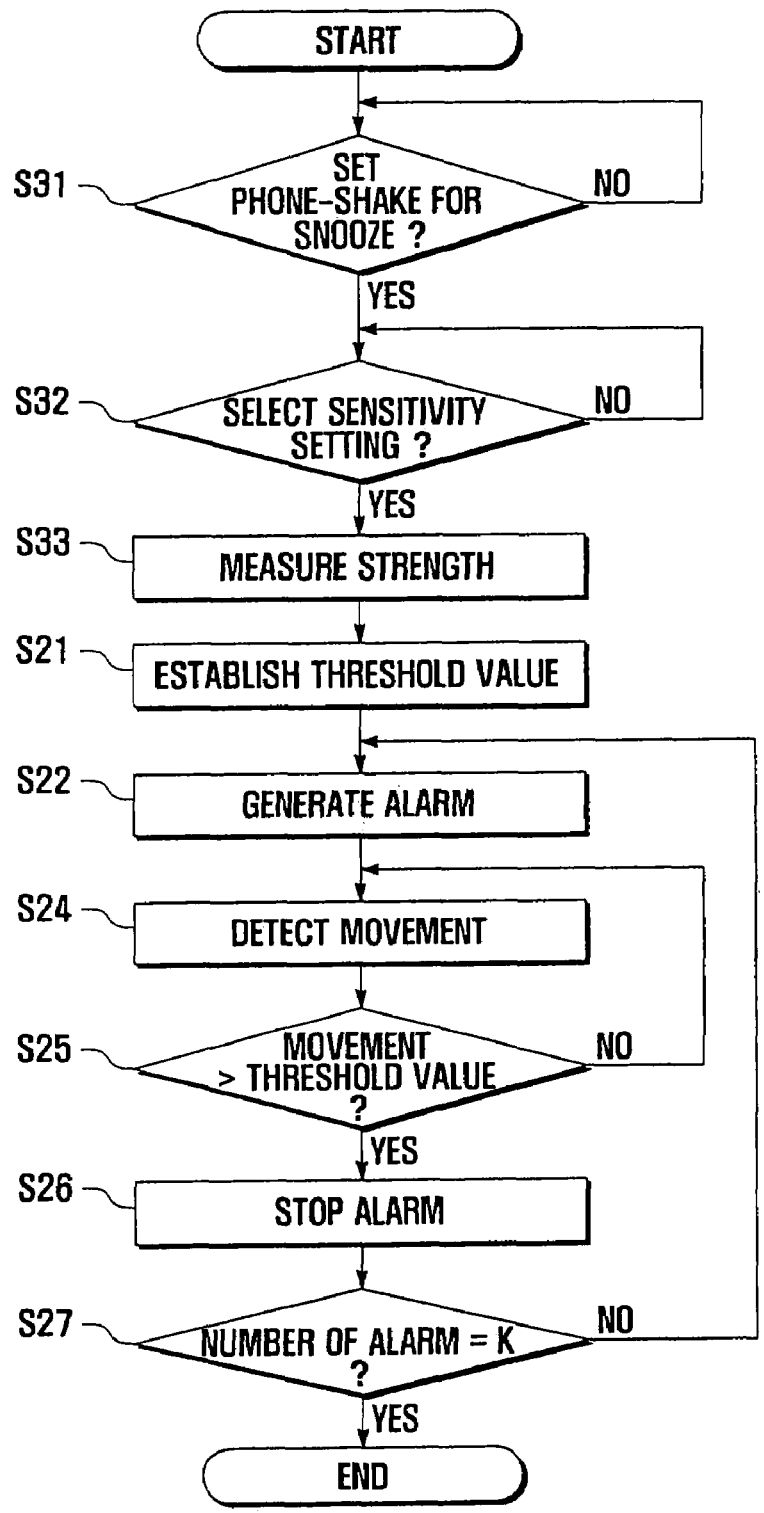
FIG. 4 is a flow diagram showing a method for controlling an alarm function of a mobile device in accordance with another exemplary embodiment of the present invention.

FIG. 4 is a flow diagram showing a method for controlling an alarm function of a mobile device in accordance with another exemplary embodiment of the present invention.

Referring to FIG. 4 together with FIG. 1, in step S31 the alarm control unit 18a determines whether the function of a phone-shake for snooze is set or canceled. What is called a mobile device-shake (e.g., a phone) for snooze means that a threshold value is established depending on a user's action shaking the mobile device 10. That is, a user can set a thresh-old value by using a shake motion in an alarm setting menu.

Figure 5A:
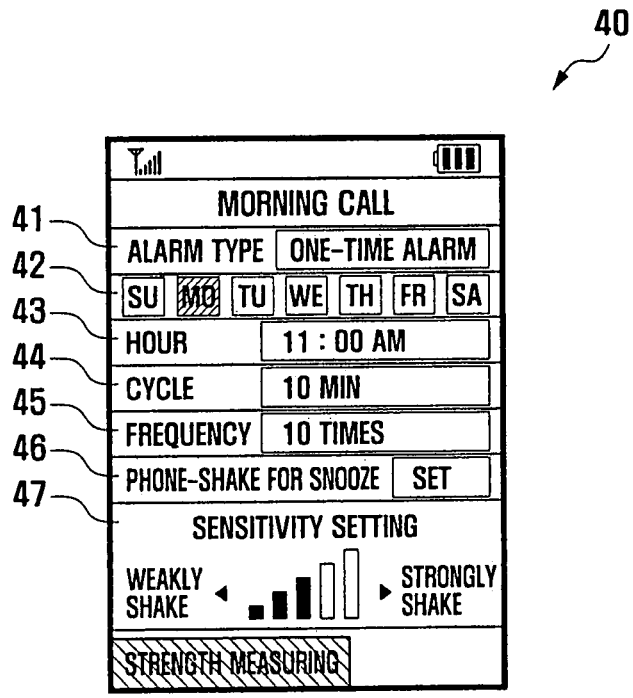
Figure 5B:
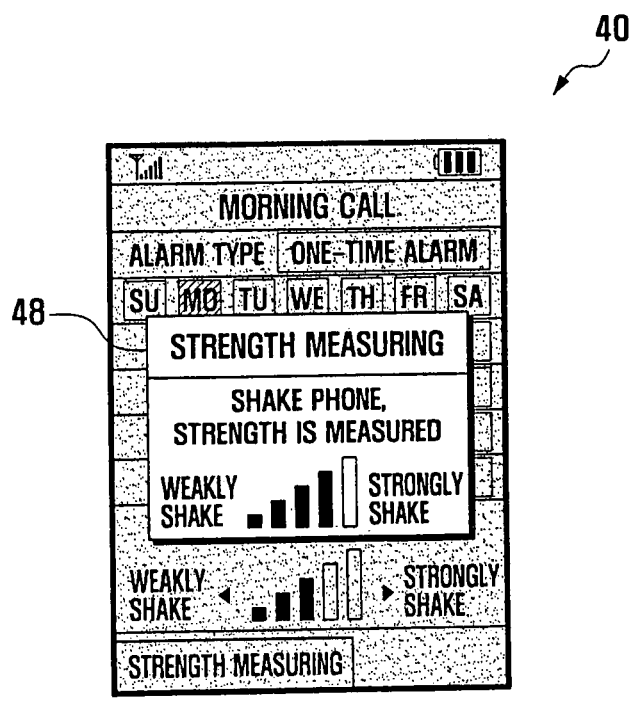

FIGS. 5A to 5C are exemplary screen views showing an alarm setting menu used in conjunction with the method shown in FIG. 4. An alarm setting menu 40 shown in FIGS. 5A to 5C includes various selectable alarm conditions, namely, an alarm type 41, a day of the week 42, an alarm hour 43, an alarm cycle 44, an alarm frequency 45, a phone-shake for snooze 46, and a sensitivity setting 47.

If the function of a phone-shake for snooze 46 is set, in step S32 the alarm control unit 18a determines whether an item of a sensitivity setting 47 is selected. In the alarm setting menu 40, a user can select an item of a sensitivity setting 47 by using up and down navigation keys, for example. In comparison with this, a user can select set or cancel in an item of a phone-shake for snooze 46 by using right and left navigation keys, for example. When a user presses an OK key or a left soft key to select the sensitivity setting 47, a pop-up window 48 informing a strength measuring function is launched as shown in FIG. 5B.

Next, in step S33 the inertial sensor 17 detects a user's shaking action and measures the strength of shaking. Then the inertial sensor 17 sends a measured signal to the alarm control unit 18a. In step S21, the alarm control unit 18a establishes a threshold value based on the measured signal and stores it into the storing unit 16a. FIGS. 5B and 5C show an exemplary measured strength of shaking before and after a threshold value is established. (i.e., initially 3 bars is altered to 4 bars).

In step S22 the alarm control unit 18a generates an alarm at a predefined hour. A series of following steps S23 to S27 after alarm occurrence are similar to those in the former embodi-ment described with regard to FIG. 2, so related descriptions of these functions are omitted. In addition, FIG. 4 omits the above-discussed step S23 in FIG. 2 to avoid complexity due to repetition.

As discussed heretofore, this embodiment is characterized by enabling a user to establish a threshold value. If a user strongly shakes the mobile device, a threshold value is estab-lished to high. So the sensitivity of the mobile device becomes lower. Contrary to this, a user's weak shaking results in a low threshold value and higher sensitivity.

On the other hand, considering that the inertial sensor easily responds to minute trembling movements, it is neces-sary to judge whether an output of the inertial sensor is in response to an alarm sound or a user's action. In other words, a very lower threshold value may cause an alarm sound to be regarded as a user's action, whereas a very higher threshold value may fail to detect a user's minute action. Therefore, it may be often desirable to adjust a threshold value according to alarm sounds. The following embodiment is related to such a case.

Figure 6:
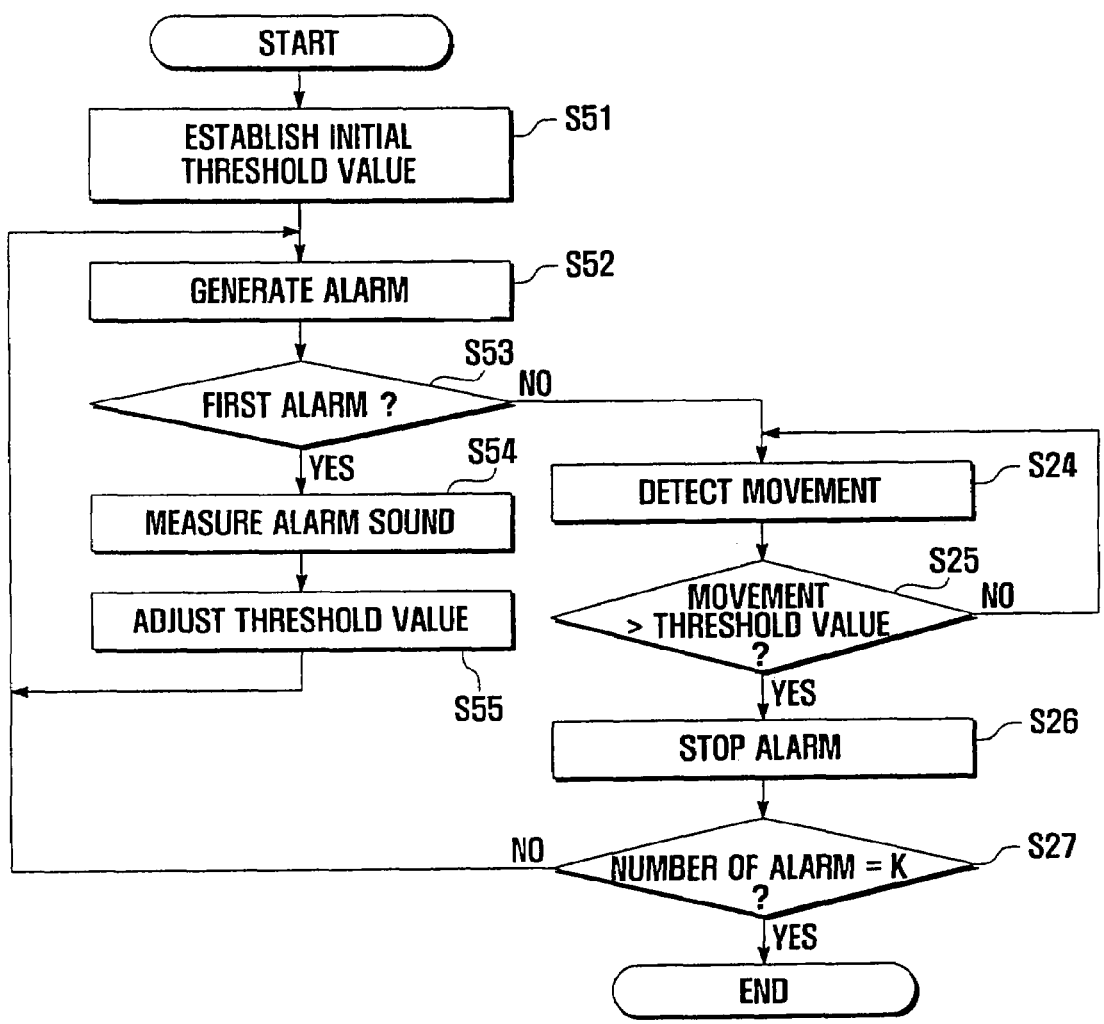
FIG. 6 is a flow diagram showing a method for controlling an alarm function of a mobile device in accordance with still another exemplary embodiment of the present invention.

FIG. 6 is a flow diagram showing a method for controlling an alarm function of a mobile device in accordance with still another exemplary embodiment of the present invention.

Referring to FIGS. 1 and 6, the alarm control unit 18a establishes an initial threshold value in step S51 and stores the initial threshold value into the threshold value storing unit 16a. As discussed above, the initial threshold value is a default or established by a user. Alternatively, the initial threshold value may be an adjusted threshold value in an earlier alarm function.

In step S52, the alarm control unit 18a generates an alarm at a predefined alarm hour. After a first alarm occurs, in step S53 the alarm control unit 18a determines whether this occur-ring alarm is the first of predefined alarm occurrences. For example, if the alarm conditions are set to five times at ten-minute intervals from six a.m. on Monday, the alarm control unit determines whether a current alarm is the first one that occurs at six a.m.

If it is the first alarm, in step S54 the inertial sensor 17 detects the movement of the mobile device 10 due to alarm sounds. Then the inertial sensor 17 sends movement-sensing signals to the alarm control unit 18a. In step S55, the alarm control unit 18a adjusts the initial threshold value to, for example, twice the maximum of the received signals, i.e., alarm sounds.

Figure 7:
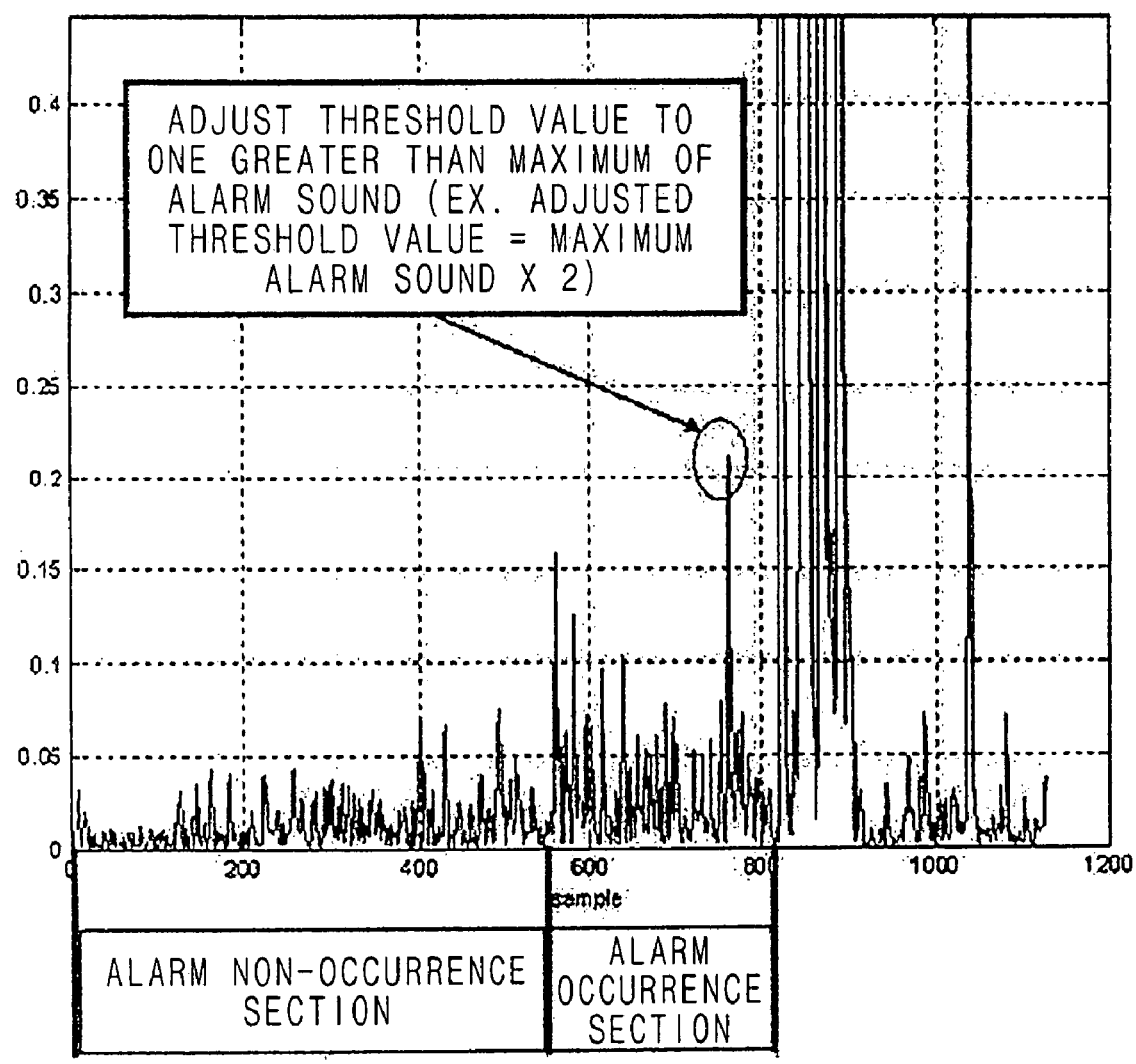
FIG. 7 is a graph showing movement-sensing signals that vary according to alarm occurrence.
Figure 8:
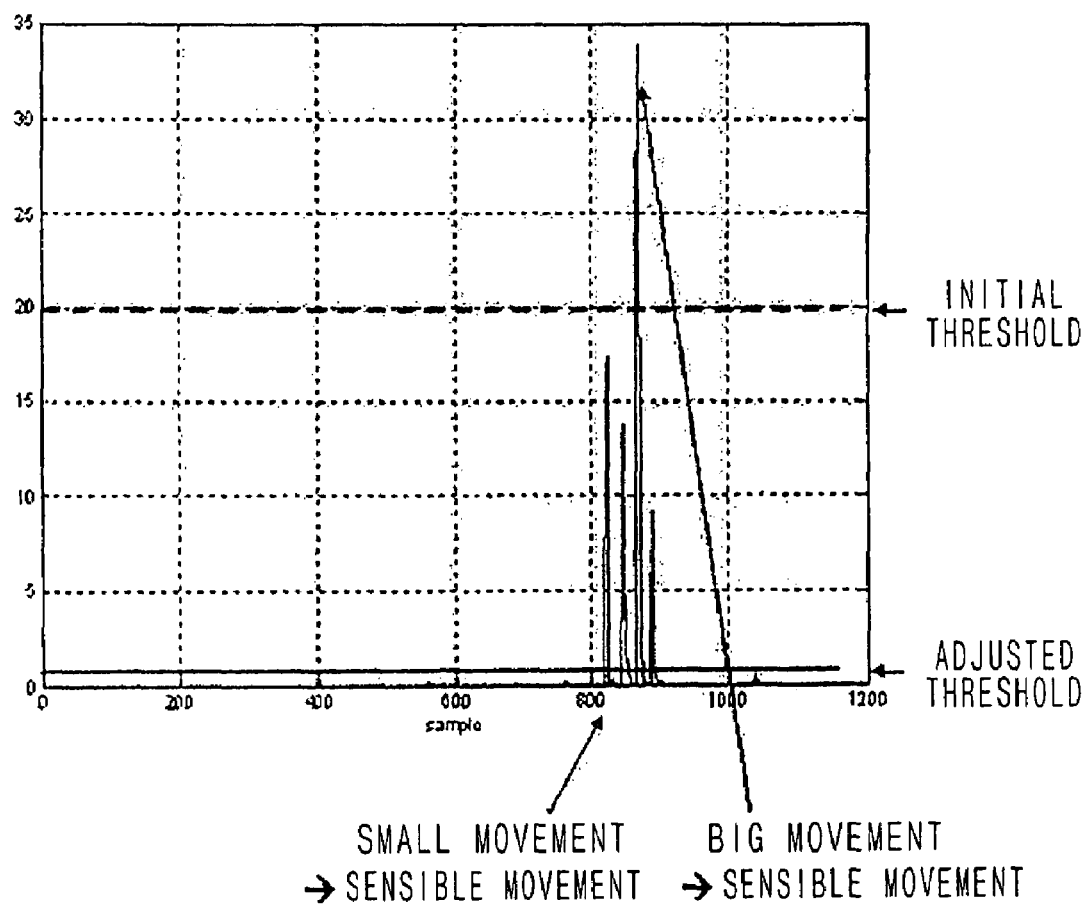
FIG. 8 is a graph showing an initial threshold value and an adjusted threshold value based on a detected alarm shown in FIG. 7.

FIG. 7 is a graph showing movement-sensing signals that vary according to alarm occurrence, and FIG. 8 is a graph showing an initial threshold value and an adjusted threshold value based on a detected alarm shown in FIG. 7. FIG. 7 is an enlarged view that FIG. 8 is enlarged one hundred times in a vertical direction.

As shown in FIG. 7, movement-sensing signals are greater in an alarm occurrence section than in an alarm non-occurrence section. Once receiving movement-sensing signals due to alarm sounds from the inertial sensor 17, the alarm control unit 18a extracts the maximum from the received signals in the alarm occurrence section, and then adjusts the initial threshold value to twice the maximum of the received signals. The adjusted threshold value is greater than the maximum of the alarm sounds, but is much smaller than the initial threshold value as shown in FIG. 8.

The adjusted threshold value is not always twice the maximum of the alarm sound. In general the adjust threshold value is greater than the maximum of the alarm sound and smaller than the initial threshold value. The adjusted threshold value between the detected alarm sound and the initial threshold value not only prevents alarm sounds from being regarded as a user's action, but also allows detecting a user's minute action.

Returning to FIGS. 1 and 6, after step S55 for adjusting the threshold value, the alarm control unit 18a generates the next alarm in step 52. If this alarm is determined to be a non-first alarm in step S53, the inertial sensor 17 detects the movement of the mobile device 10 in step S24 and sends a movement-sensing signal to the alarm control unit 18a. In step S25, the alarm control unit 18a compares the magnitude of a received movement-sensing signal with the adjusted threshold value.

If the magnitude of a movement-sensing signal is greater than the adjusted threshold value as the result of comparison in step S257, the alarm control unit 18a stops the current alarm in step S26. If the magnitude of a movement-sensing signal is smaller than the threshold value, the alarm control unit 18a performs again the above-discussed step S24.

After the current alarm occurrence is stopped, in step S26 the alarm control unit 18a determines whether the number of the current alarm occurrence satisfies a predefined alarm frequency (k). If a predefined alarm frequency is satisfied, the alarm control unit 18a terminates an alarm function. Otherwise, the alarm control unit 18a returns to step S52 and generates the next alarm.

In this embodiment, a threshold value is initially established and then adjusted by sensing the movement of the mobile device due to the first alarm occurrence. Such a method may be also applied to a case there is no initial threshold value. The following embodiment is related to such a case.

Figure 9:
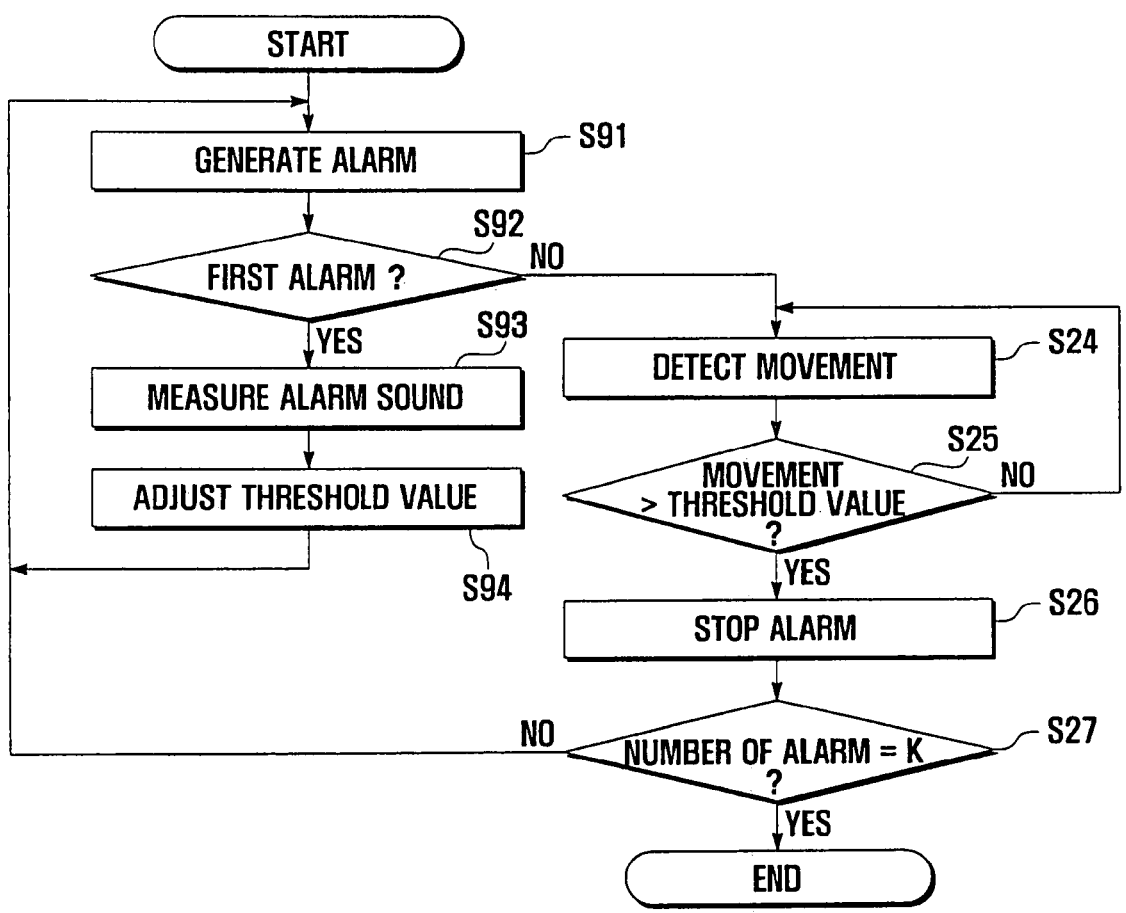
FIG. 9 is a flow diagram showing a method for controlling an alarm function of a mobile device in accordance with still another exemplary embodiment of the present invention.

FIG. 9 is a flow diagram showing a method for controlling an alarm function of a mobile device in accordance with still another exemplary embodiment of the present invention.

Referring to FIGS. 1 and 9, the alarm control unit 18a generates an alarm at a predefined alarm hour in step S91, and determines whether this occurring alarm is the first of predefined alarm occurrences in step S92. If it is the first alarm, in step S93 the inertial sensor 17 detects the movement of the mobile device 10 due to alarm sounds and sends its signal to the alarm control unit 18a. In step S94, the alarm control unit 18a establishes a threshold value to a multiple of the maximum of the received signals of alarm sounds.

After establishing a threshold value, the alarm control unit 18a returns to step 91 and generates the next alarm. If this alarm is determined to a non-first alarm in step S92, performed are a series of steps S95 to S98 of detecting the movement, comparing the detected movement with the threshold value, and stopping the current alarm. Processing shown in steps S24 to S27 are similar to those described with regard to FIG. 2. A discussion of such processing would be redundant and need not be repeated herein for an understanding of the invention.

The above-discussed embodiments allow common controlling an alarm function by means of movement sensing. In another aspect, the present invention may allow controlling an alarm function by means of voice recognition.

Figure 10:
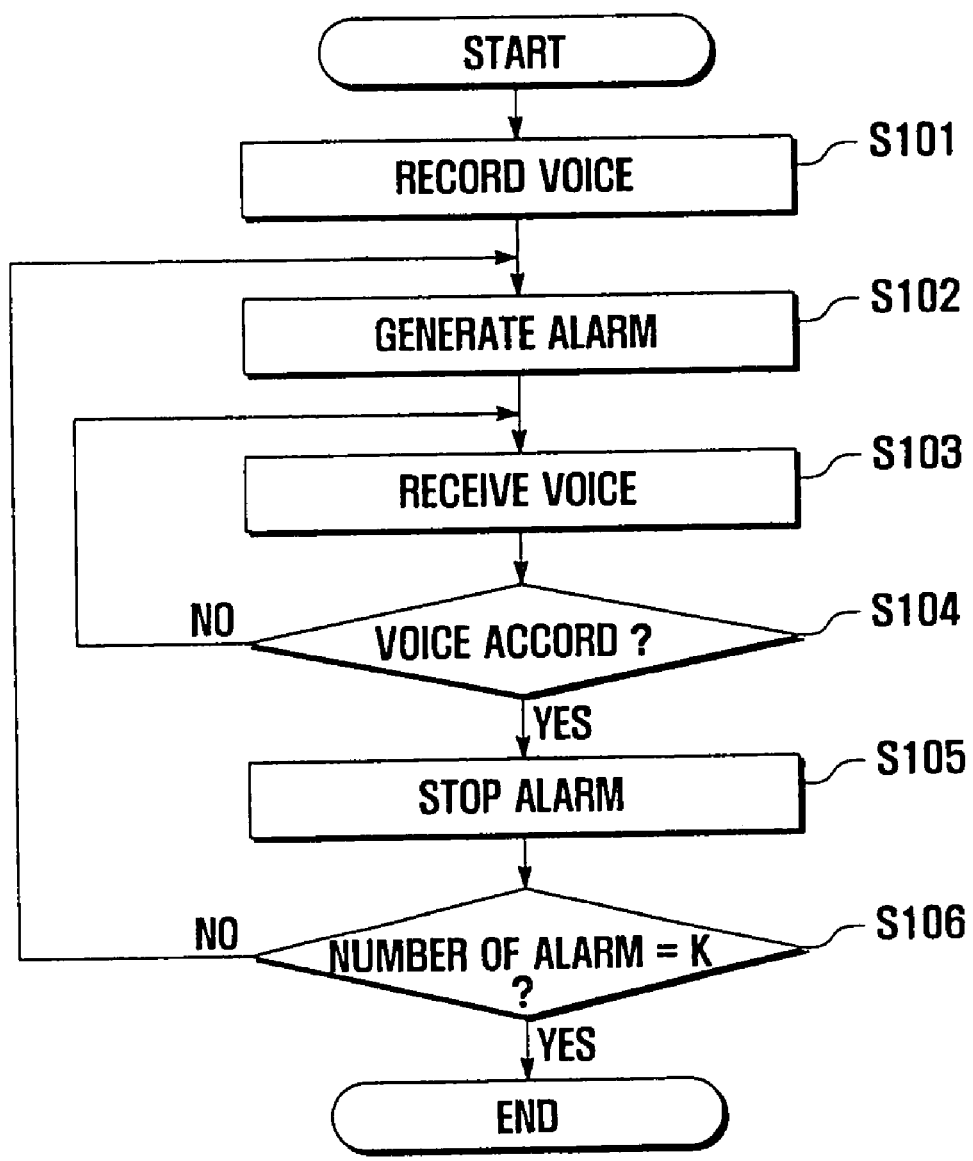
FIG. 10 is a flow diagram showing a method for controlling an alarm function of a mobile device in accordance with still another exemplary embodiment of the present invention.

FIG. 10 is a flow diagram showing a method for controlling an alarm function of a mobile device in accordance with still another exemplary embodiment of the present invention.

Referring to FIGS. 1 and 10, in step S101 the alarm control unit 18a records a user's voice, e.g., 'Stop', and stores it into the standard voice storing unit 16b. Such a recorded voice will be used as a standard for alarm control.

Next, the alarm control unit 18a generates an alarm at a predefined alarm hour in step S102, and then receives a user's voice signal through the microphone MIC in step S103. Then, in step S104 the alarm control unit 18a compares the received voice signal with the standard voice signal stored in the storing unit 16b. If both voice signals are in accordance with each other, the alarm control unit 18a stops a current alarm occurrence in step S105.

After the current alarm occurrence is stopped, in step S106 the alarm control unit 18a determines whether the number of the current alarm occurrence satisfies a predefined alarm frequency (k). If a predefined alarm frequency is satisfied, the alarm control unit 18a terminates an alarm function. Otherwise, the alarm control unit 18a returns to step S102 and generates the next alarm.

In the above-discussed step S101, the alarm control unit 18a may convert an analog voice input into digital voice signals, extract audio features from the converted voice signals, and store the extracted audio features. Similarly, in step S103, the alarm control unit 18a may convert an analog voice input into digital voice signals, and extract audio features from the converted voice signals. Additionally, in step S104 the alarm control unit 18a may compare the audio features of stored in step S101 and extracted in step S103.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While this invention has been particularly shown and described with reference to exemplary embodiments thereof, it will be understood by those skilled in the art that various changes in form and details may be made therein without departing from the spirit and scope of the invention as defined by the appended claims. For example, although the comparison to the threshold value is described with regard to being greater than the threshold value, it would be understood by those skilled in the art that such representation may also be consisted to be "at least equal to" or "greater than or equal to the threshold value."

What is claimed is:

1. A method for controlling an alarm function of a mobile device with an inertial sensor, the method comprising the steps of:
    establishing an initial threshold value for control of the alarm function;
    generating an alarm occurrence at a predefined hour;
    determining whether the alarm occurrence is the first occurrence and
    detecting a first movement of the mobile device due to the alarm occurrence through the inertial sensor; and
    adjusting the initial threshold value according to the first movement;
    detecting a second movement of the mobile device through the inertial sensor;
    comparing the second movement with the adjusted threshold value; and
    stopping the alarm occurrence if the second movement is greater than the adjusted threshold value.

2. The method of claim 1, wherein the initial threshold value is adjusted to be greater than the maximum of the first movement due to the alarm occurrence and to be smaller than the initial threshold value.

3. The method of claim 1, further comprising the steps of:
    determining whether an end signal is inputted; and
    terminating die alarm function if the end signal is inputted.

4. The method of claim 1, further comprising the steps of
    determining whether the number of the stopped alarm occurrence satisfies a predefined alarm frequency; and
    terminating the alarm function if the predefined alarm frequency is satisfied.

5. The method of claim 1, wherein the step of establishing of the initial threshold value comprises the steps of:
    detecting a third movement of the mobile device through the inertial sensor, and
    establishing the initial threshold value such that the initial threshold value is greater than the third movement.

6. A method for controlling an alarm function of a mobile device with an inertial sensor, the method comprising the steps of:
    generating an alarm occurrence at a predefined hour;
    determining whether the alarm occurrence is the first;
    detecting a first movement of the mobile device due to the alarm occurrence through the inertial sensor if the alarm occurrence is the first; and
    establishing a threshold value according to the first movement due to the alarm occurrence;
    detecting a second movement of the mobile device trough the inertial sensor if the alarm occurrence is not the first;
    comparing the second movement wit the threshold value; and
    stopping the alarm occurrence if the second movement is greater than the threshold value.

7. The method of claim 6, wherein the threshold value is established to be greater than the maximum of the first movement due to the alarm occurrence.

8. The method of claim 6, further comprising the steps of:
    determining whether an end signal is inputted; and
    terminating the alarm function if the end signal is inputted.

9. The method of claim 6, further comprising the steps of:
    determining whether the number of the stopped alarm occurrence satisfies a predefined alarm frequency; and
    terminating the alarm function if the predefined alarm frequency is satisfied.

10. An apparatus for controlling an alarm function of a mobile device, the apparatus comprising:
    a memory unit storing a threshold value and a predefined alarm hour;
    an inertial sensor detecting a first movement of the mobile device and creating a movement-sensing signal based on the first movement; and
    an alarm control unit generating an alarm occurrence at the predefined hour, comparing the movement-sensing signal with the threshold value, and stopping the alarm occurrence if the movement-sensing signal is greater than the threshold value;
    wherein the alarm control unit determines whether the alarm occurrence is the first, and, if the inertial sensor detects a second movement of the mobile device due to the alarm occurrence, adjusting the threshold value according to the second movement due to the alarm occurrence.

11. An apparatus for controlling am alarm function of a mobile device comprising:
    a processor in communication with a memory, the processor executing code for:
        receiving an indication of the occurrence of an alarm at a predetermined time;
        receiving an input signal associated with the mobile device;
        comparing the received input signal to a known threshold value; and
        stopping the alarm occurrence when said received input signal is substantially in accordance with a known reference;
    wherein the processor further executes code for:
        determining a measure of said input signal after a first alarm occurrence; and
        adjusting said reference value based on the measure of the input signal.

12. The apparatus as recited in claim 11, wherein the processor further executing code for:
    determining the number of stopped alarm occurrences; and
    terminating the alarm function when the number of stopped alarm occurrences is at least equal to a predetermined number.

13. The apparatus as recited in claim 11, wherein the known reference is selected from the group consisting of: a threshold value and a first voice signal.

14. The apparatus as recited in claim 11, wherein the received input signal is selected from the group consisting of: a movement and a second voice signal.

15. The apparatus as recited in claim 11, wherein the reference value is predetermined.

* * * * *